Dec. 7, 1971                    J. W. SHANKS                  3,625,091
DEVICES FOR SIDE-DRESSING SWAGE SET SAWS
Filed Nov. 18, 1969                                    3 Sheets-Sheet 1
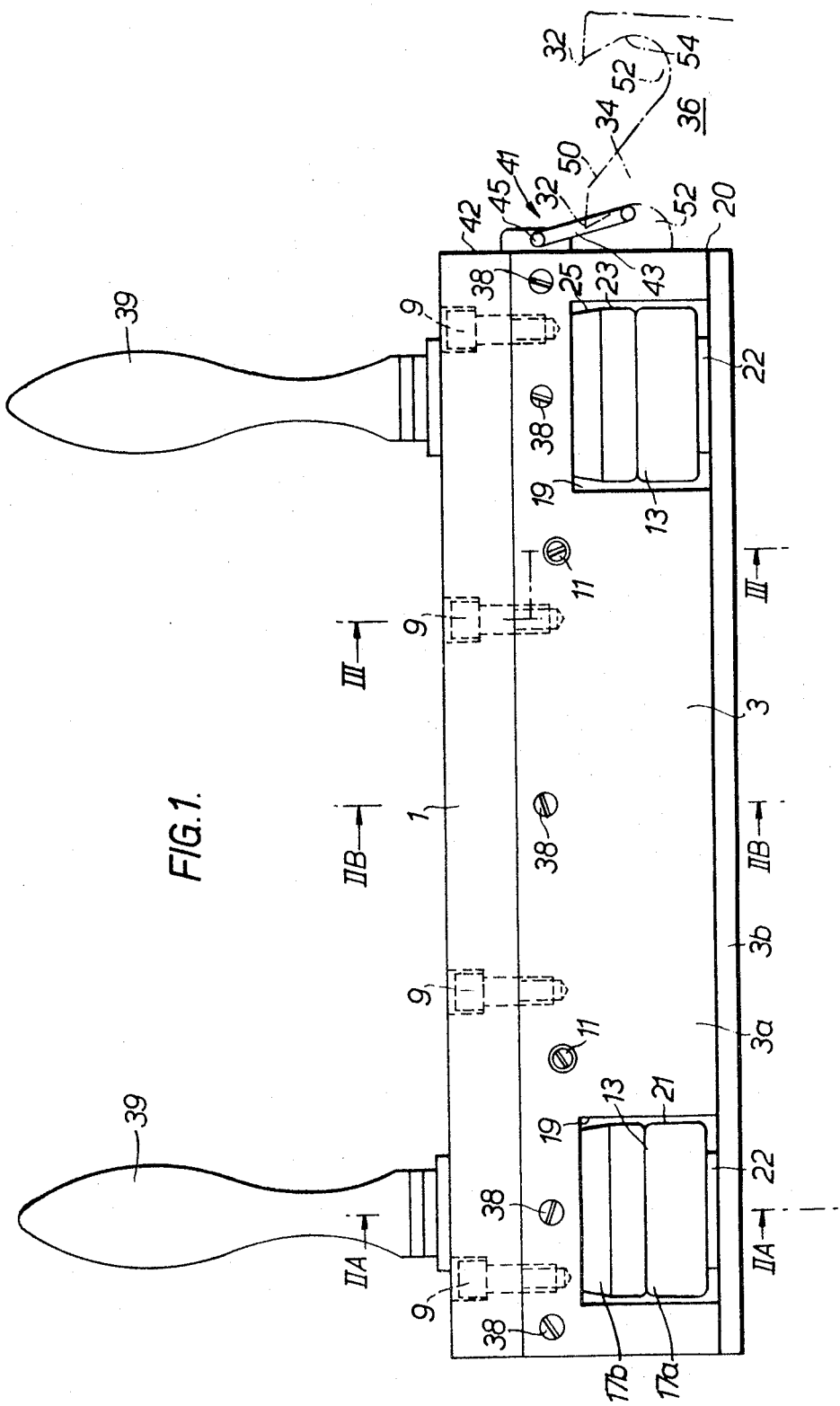

United States Patent Office 3,625,091
Patented Dec. 7, 1971

3,625,091
DEVICES FOR SIDE-DRESSING SWAGE SET SAWS
Jack Wilfred Shanks, Princes Risborough, England, assignor to National Research Development Corporation, London, England
Filed Nov. 18, 1969, Ser. No. 877,750
Claims priority, application Great Britain, Nov. 20, 1968, 55,124/68
Int. Cl. B23d 63/06
U.S. Cl. 76—49                                      8 Claims

ABSTRACT OF THE DISCLOSURE

A device for side-dressing swage set saws including two pairs of rollers with the nips of the two pairs on a common plane. The rollers have surfaces for forming the swages into the required form i.e. frusto-conical surfaces for forming tapered wedges. A guide is provided for co-operation with the tops of the teeth to locate the swages relative to the frusto-conical surfaces of the rollers. The position of the guide is adjustable to allow the formation of different sets on the saw. The rollers also have cylindrical surfaces for co-operation with opposite surfaces of the saw beneath the swages. The distance between the rollers of a pair is adjustable whereby the device can operate upon different gauges of saws.

---

This invention relates to devices for side-dressing swage set saws.

Side-dressing devices are known which consist of an anvil and a movable die. The anvil and die are so formed that upon the die being moved towards the anvil by a manually operated lever, the bulbous swage on the tooth face adjacent the top of the tooth is formed into the required, usually tapered, shape. Such devices operate upon only one tooth at a time and the side-dressing procedure is therefore lengthy. Also, the sets and total cutting widths achieved are not uniform and may vary due to progressive fatigue or lack of concentration of the operator.

It is an object of the present invention to provide improved results in side-dressing operations.

According to the present invention there is provided a device for side-dressing swage set saws, including two surfaces fixedly located one relative to the other and adapted to be disposed one at each side of the saw, the two surfaces being so formed and disposed that upon relative movement between the saw and the device in a direction parallel to the toothed edge of the saw the swage on each tooth passing between the said surfaces is side-dressed by co-operation of the surfaces with the swage.

In the case of saws having their teeth disposed on straight lines, the relative movement between the saw and the device is linear and in the case of circular saws the relative movement between the saw and the device is circular arcuate.

The said two surfaces may be formed by the peripheral surfaces of rollers having parallel axes of rotation.

There may be two pairs of rollers, the plane containing the axes of the first pair of rollers being parallel to the plane containing the axes of the second pair of rollers, each of said two surfaces being formed in part by one of the rollers of the first pair and in part by one of the rollers of the second pair, the arrangement being such that a tooth is partially side-dressed by the first pair of rollers and the side-dressing is completed by the second pair of rollers.

The rollers may have further, cylindrical surfaces for co-operation with opposite surfaces of the saw beneath the swages.

The distance between the said further cylindrical surfaces may be adjustable whereby the device may be adjusted to operate upon saws of various thicknesses.

The two surfaces for co-operation with the swages may be convergent upon one another whereby a tapered swage may be produced, and a guide may be provided which has a surface for engagement by the tops of the teeth of a saw, the position of the guide surface being adjustable relative to the two surfaces for co-operation with the swages whereby the set imposed on a saw may be selected. The rollers may have surface portions of frusto-conical shape to constitute the convergent surfaces for co-operation with the swages.

There may be provided handles for manually moving the device over a stationary saw, and a pawl adapted to ride over the tops of teeth when the device is moved in one direction over a saw and to engage the throat of a tooth when the device is moved in the opposite direction.

According to the invention there is also provided apparatus for side-dressing swage set circular saws, including two surfaces fixedly located one relative to the other and adapted to be disposed one at each side of the saw, a hub adapted to mount a circular saw, constraining means adapted to maintain said surfaces at a predetermined distance from said hub, said two surfaces being so formed and disposed that upon relative movement between the saw and said surfaces in a direction circumferentially of the saw the swage or each tooth passing between said surfaces is side-dressed by co-operation of the surfaces with the swage.

An embodiment of the present invention will now be described, by way of example, with reference to the accompanying drawings, in which:

FIG. 1 illustrates a side view of a device in accordance with the present invention in an operative position straddling the toothed edge of a bandsaw;

Figure 3:
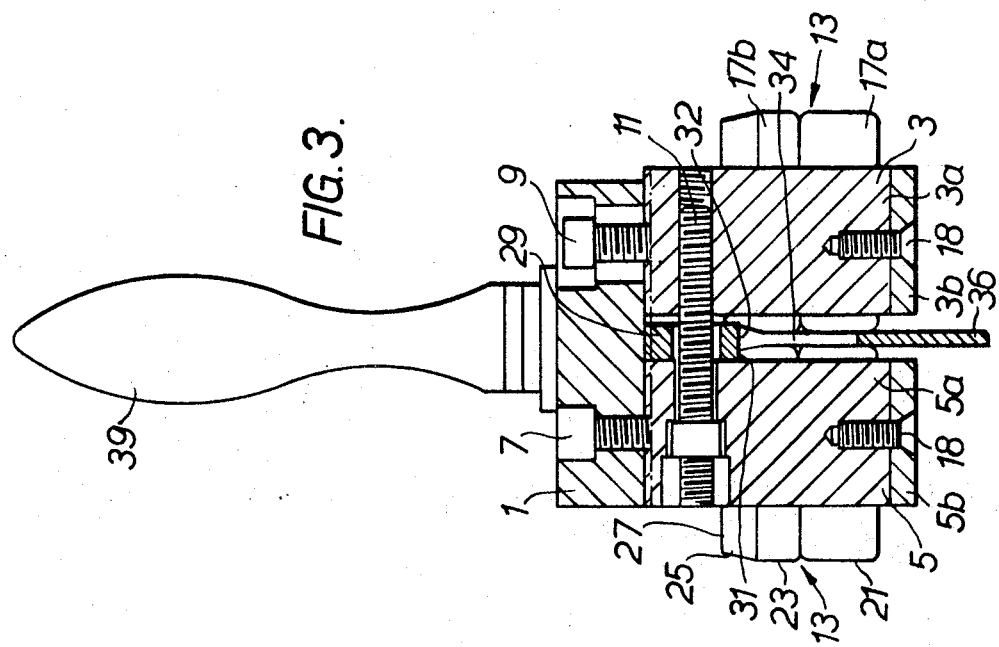
FIG. 3 illustrates a sectional view of the line III—III in FIG. 1.

The side-dressing device illustrated in the drawings comprises a bridge member 1 and two side members 3 and 5. The side members 3 and 5 are secured to the bridge member 1 and are disposed in parallel spaced-apart relationship. The side member 5 is fixedly secured to the bridge member 1 by screws 7 (see FIG. 3) and the side member 3 is adjustably secured to the bridge member 1 by screws 9 which, when locked, prevent movement of the side member 3 relative to the bridge member 1 and, when unlocked, allow adjustment of the position of the side member 3 relative to the side member 5, i.e. adjustment of the width of the space between the two side members 3 and 5.

Adjustment of the width of the space between the two side members 3 and 5 is achieved by means of screws 11 (see FIGS. 1 and 3) made captive in the side member 5 and threadedly engaged with the side member 3. After unlocking the screws 9, the screws 11 may be turned to adjust the distance between the side members 3 and 5, the screws 9 subsequently being re-locked.

Each of the side members 3 and 5 is formed of two parts, namely a body part 3a and 5a and a cover plate 3b and 5b secured to the body part by screws 18. Each body part 3a and 5a has two cut-outs 19 open at the interface 20 of the body part 3a, 5a with the cover plate 3b, 5b and closed in the plane of the interface 20 by the cover plate 3b, 5b. The cut-outs 19 in each body part are disposed one adjacent each end of the respective body part, and the cut-outs 19 in the side members are disposed opposite one another.

Disposed in each of the cut-outs 19 is a roller 13. The rollers 13 are carried on shafts 15 secured in the side members 3, 5 by grub screws 16 and the peripheries of the rollers extend into the space between the side memmembers. As can readily be observed and understood the four rollers are arranged in two pairs, the nips of the two pairs lie on a common plane and the axes of the members of each pair lie on parallel planes. A spacer member in the form of a washer 22 is disposed between each roller and its related cover plate 3b, 5b. In the present example, each roller 13 consists of two ball journal bearings 17a, 17b. The bearings 17a have cylindrical peripheral surfaces 21 and are located further from the bridge member 1. Each bearing 17b, located nearer the bridge member 1, has a peripheral surface formed by a cylindrical portion 23 adjacent the bearing 17a and a frusto-conical portion 25 contiguous with the cylindrical portion 23. The larger diameter of the frusto-conical surface portion 25 is the same as the diameter of the cylindrical portion 23 and the smaller diameter is disposed at the radial face 27 of the bearing 17 nearer the bridge member 1.

The radial faces 27 of the bearings 17 are disposed in a common plane parallel to and spaced from the nearer face of the bridge member 1.

A guide member 29 is disposed between the two side members 3, 5 adjacent the bridge member 1 and is substantially co-extensive in length with the bridge member. The guide member 29 has a guide surface 31 remote from the bridge member 1 which is engaged by the tops 32 of the teeth 34 of the saw 36 in operation. The distance of the surface 31 from the bridge member 1 may be adjusted by screws 33 held captive in the bridge member 1 and threadedly engaged in the guide member 29. The guide member 29 is fixedly held in its selected position by means of lock screws 35 which are released during adjustment of the position of the guide member 29. The lock screws 35 may be turned by a key introduced through bores 38 in the side member 3.

The guide member 29 has four cut-outs 37 disposed in the regions of the rollers 13. The cut-outs 37 allow the guide surface 31 to be spaced further from the bridge member 1 than the faces 27 of the rollers 13, as is required in use. The guide surface 31 is continuous throughout its length although it is of reduced width, due to the cut-outs 37 between the rollers of each pair of rollers 13.

The above described embodiment of the invention is intended for use on a bandsaw 36 when the saw 36 is disposed horizontally with the teeth 34 uppermost. So that the device can be moved over the saw 36, the bridge member 1 is provided with two handles 39. It may be desirable to support the saw in the region where the device is used and for this purpose parallel guides may be provided on a table for keeping the plane of the band vertical. A pawl device 41 is provided on the trailing end 42 of the device. The pawl device 41 consist of a metal ring 43 pivotally connected to the bridge member 1 at 45.

Prior to a side-dressing operation upon a particular bandsaw, the device is adjusted to the gauge of the band. The adjustment is performed by slackening off the screws 9 and by turning the captive screws 11 until the distance between adjacent cylindrical surfaces 21 and 23 of the rollers 13 is equal to the gauge of the band. The screws 9 are then tightened so that the side member 3 is rigidly secured to the bridge member 1 and there can be no movement of the side member 3 relative to the side member 1.

As is known, the kerf must be greater than the thickness, i.e. gauge, of the band. The dimension of the kerf is a matter of choice but the more it can be reduced the less is the wastage of the material to be cut. The lateral dimension of the swage of a saw side-dressed by the above described device is selected by selection of the position of the guide surface 31 relative to the radial faces 27 of the rollers 13. It will be realised that because the tops 32 of the teeth 34 engage the guide surface 31, the position of the tops of the teeth relative to the radial faces 27 and hence the position of the tops 32 of the teeth 34 in the wedgeshaped region between the frusto-conical surfaces 25 of the rollers 13, is determined by the position of the guide surface 31. Therefore, the position of the guide surface 31 is so selected that the distance between points on the frusto-conical surfaces 25 of the rollers 13 of a pair and lying in the plane of the guide surface 31 is equal to the desired kerf dimension. However, because some of the top of each tooth is ground off in the subsequent grinding operation, the above description of the selection of the swage width is only approximately true and it may be necessary to position the plane of the guide surface 31 nearer the plane of the radial surfaces 27 of the rollers so that the swage has the desired width after top grinding.

The above described embodiment of the invention has four rollers 13, i.e. two sets of co-operating rollers. Two sets are used rather than one in this embodiment for several reasons. The stability of the device is improved, that is, a plane containing the axes of rotation of the rollers of a pair is held normal to the plane of the portion of the saw being side-dressed.

By arranging that the guide surface 31 is inclined to the plane of the radial surfaces 27 with the portion of the guide surface at the leading end of the device (i.e. the left hand end as seen in FIG. 1) nearer the bridge member 1 than the other end portion of the guide surface 31 is to the bridge member 1, the side-dressing of each tooth is performed in two stages. Also, by arranging that the distance between the nips of the two pairs of rollers 13 is other than an integral multiple of the pitch of the teeth of the saw to be operated upon, the force required to move the device over the saw is to some extent smoothed out.

It will be understood that instead of inclining the guide surface, the rollers could have different side-dressing surfaces 25 in order to achieve two stages of side-dressing if so desired.

The device having been adjusted in the above described manner is now ready for side-dressing the particular saw for which the adjustment is appropriate. The saw 36 is set up on a supporting arrangement which comprises rollers and a table having two parallel spaced apart guides. With such an arrangement the saw may be moved so that different portions of the saw are brought in sequence on to the table and between the guides. The teeth 34 of the saw are uppermost.

Figure 2:
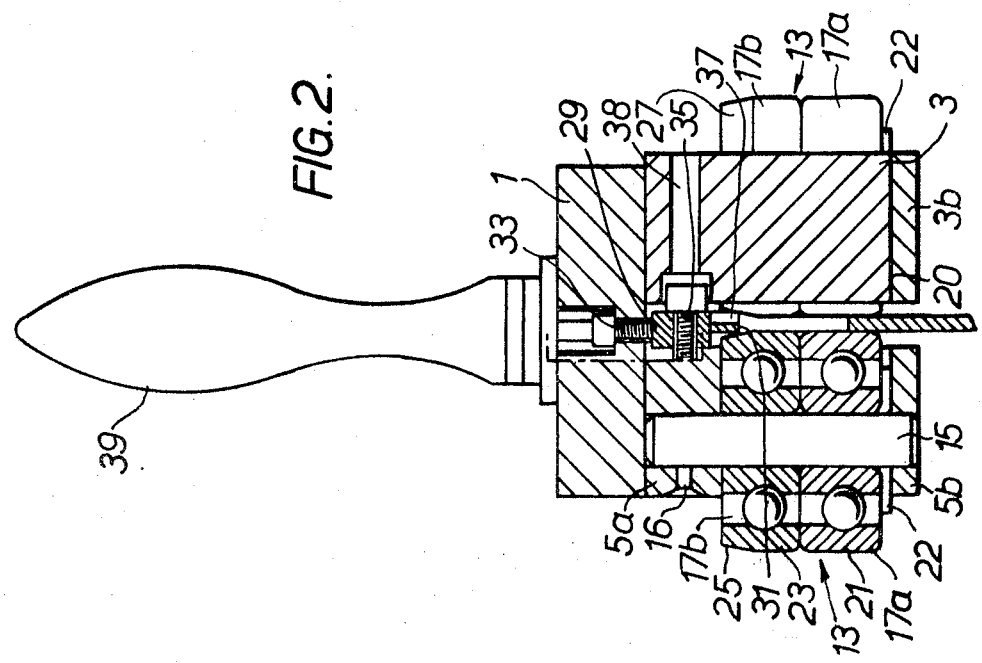
FIG. 2 illustrates a multiple sectional view of the device illustrated in FIG. 1, the left hand half being taken on the line IIA—IIA in FIG. 1 and the right half being taken on the line IIB—IIB in FIG. 1.

The device is positioned on the portion of the saw supported on the table between the guides in a manner illustrated in FIGS. 1 to 3 of the drawings, with the leading end of the device disposed so that upon movement of the device over the saw with the leading end leading, the leading end initially passes over the back 50 of a tooth 34 and subsequently over the top 32 of the tooth 34. The device is lowered onto the saw so that it rests thereon with the guide surface 31 engaging the tops 32 of the teeth 34.

The handles are grasped and the device is moved over the saw so as to maintain the tops 32 of the teeth 34 in engagement with the guide surface 31. When the device has been moved to the ends of the guides supporting the saw, the device is drawn backwards. As the device moves backwards the pawl ring 43 drops into a throat 52 of a tooth 34 and the saw is moved with the device, by abutment of the ring 43 both with the trailing end 42 of the device and with a tooth, so that a further portion of the saw is brought into the region of the saw-supporting guides by continued backwards movement of the device. When the device is located adjacent the rearward end of the saw-supporting guides, the device is moved forwards again to perform further side-dressing operations. This cycle of forward and rearward motions of the device is continued until all the teeth 34 have been side-dressed.

Figure 4:
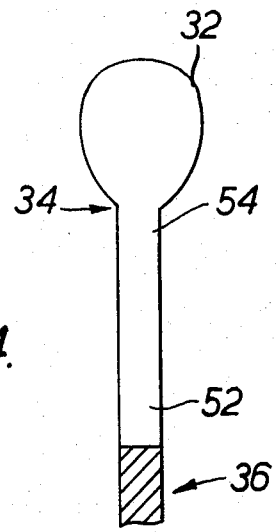
FIG. 4 illustrates a front elevational view of saw tooth after swaging and before side-dressing.

As is known, when viewed in the direction parallel to the length of the saw, the face 54 of a tooth 34 adjacent the top 46 is bulbous, as illustrated in FIG. 4, after the swaging operation.

As the bulbous swage enters the nip of the leading set of rollers 13 it is deformed to conform to the frusto-conical surfaces 25.

The tooth cannot rise, relative to the device, upon reaction of the bulbous swage with the surfaces 25 because the top 32 of the tooth is in engagement with the guide surface 31. In the present embodiment the swage is only partially side-dressed by the first set of rollers 13. It is subsequently fully side-dressed to the form illustrated in FIG. 5 when the second, trailing set of rollers pass the swage.

Figure 5:
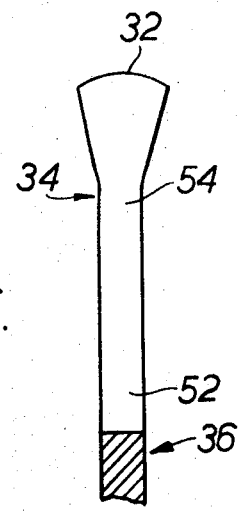
FIG. 5 is a view similar to FIG. 4 after side-dressing and before grinding.
Figure 6:
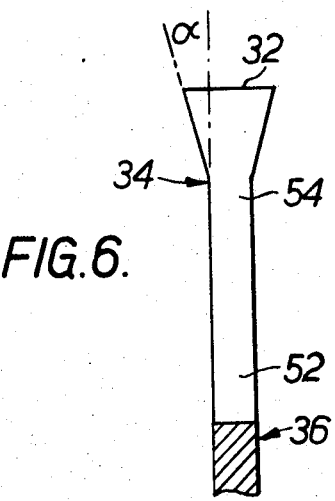
FIG. 6 is a view similar to FIG. 5, after side-dressing and after grinding.

As can be seen in FIG. 5 the tooth top is convex, and the convexity is ground off to the form illustrated in FIG. 6. The face 54 is also ground.

It will be realised that the swage angle (see FIG. 6) is determined by the cone angle of the frusto-conical surfaces 25 of the rollers 13. In order to produce different swage angles a plurality of sets of interchangeable rollers would be provided with the sets having different cone angles of the frusto-conical surfaces. By making each side member 3, 5 in two parts, i.e. a body part 3a, 5a and a cover plate 3b, 5b, the interchanging of rollers is facilitated. The screws 18 are withdrawn, the cover plates 3b, 5b are removed, the grub screws 16 are slackened and the rollers 13 and their shafts 15 are readily removed from the remainder of the tool.

Whilst the rollers of the above described embodiment are appropriate for side-dressing swages to a tapered shape, it is to be understood that other swage shapes may be formed by a device in accordance with the present invention. For example, a parallel-sided swage could be produced by stepped rollers each having a cylindrical surface rather than the frusto-conical surface described above.

Whilst the embodiment of the invention specifically described above has two sets of rollers for the reasons stated above, it is believed that satisfactory results could be achieved with a device having only a single set of rollers.

It will be understood that more than two sets of rollers may be included in a device in accordance with the present invention and in this case the side-dressing would be progressively performed.

It has been found that much greater accuracy and uniformity is obtainable with the device specifically described above. Comparative tests have been conducted on similar bandsaw blades 27 feet long. The "known" side-dresser was of the known type in which each swage is operated upon individually by a device comprising an anvil and a die movable by a manually operated lever.

| Type of side-dresser | Average tooth width, mm. | Total set, mm. | | Variations of total tooth width, mm.[1] |
|---|---|---|---|---|
| | | Maximum | Minimum | |
| Known | 2.74 | 1.83 | 0.66 | 2.44–3.04 |
| As described above | 2.48 | 1.04 | 0.96 | 2.45–2.51 |

[1] The ranges given are those within which 95% of the teeth are included.

The time taken by a skilled operator to side-dress the saw with the known device was 25 mins. although typical times probably lie in the range 10 to 25 mins. The time taken to side-dress the saw with the device as described above was less than a minute.

Bearings 17a and 17b were selected to form the rollers in the above described embodiment because they are readily available. Two bearings were selected to form each roller because it is desirable to have a larger axial length of cylindrical surface for engaging the saw than was readily available on a single bearing. The large axial length of cylindrical surface is desirable to reduce to a minimum approaching zero rocking motion of the device relative to the saw in planes normal to the plane of the portion of the saw being operated upon.

Whilst this device specifically described above is intended to be manually moved over a saw, it is to be understood that embodiments of the invention may be constructed which are appropriate for mounting in the path of a saw as it travels towards and subsequently through an automatic grinding machine.

The embodiment of the invention specifically described above is intended for side-dressing swage set band saws. The invention may also be embodied in a device for side-dressing swage set circular saws. The latter form of device may include a single pair of rollers and the bridge and side members are carried by an arm. The arm extends over the surface of the circular saw and co-operates with a hub upon which the saw is mounted for the side-dressing operation. The axes of the rollers are disposed radially of the axis of the hub. The arrangement is such that the rollers, during operation, could not move radially towards or away from the centre of the saw and the kerf width would be selected by adjustment of the radial position of the rollers, i.e. the distance of the surfaces 27 from the centre of the saw and means are provided for adjusting the radial position of the rollers to take account of the desired kerf width and to enable the device to operate upon saws having a variety of diameters, both nominal and actual. To operate the device, the device is rotated about the hub.

I claim:

1. A device for side-dressing swage set saws including:
    two surfaces located one relative to the other so as to be disposed one at each side of a saw,
    said surfaces being adapted to co-operate with and side-dress the swage of each tooth upon relative movement between the saw and the device in a direction parallel to the toothed edge of the saw,
    the said surfaces having the form of peripheral cross-sectionally circular surfaces of two rollers each of which is freely rotatable about a fixed axis.

2. A device as claimed in claim 1, including: parallel axes of rotation for said rollers.

3. A device as claimed in claim 2, including:
    at least one further pair of rollers having axes of rotation parallel to the rollers of the first-mentioned pair of rollers;
    each of said two surfaces being formed in part by one of the rollers of the first-mentioned pair and in part by one of the rollers of the further pair, whereby a tooth is partially side-dressed by the first pair of rollers and the side-dressing is completed by the second pair or further pairs of rollers.

4. A device as claimed in claim 2, wherein: such rollers have further, cylindrical surfaces adapted to co-operate with opposite surfaces of the saw beneath the swages.

5. A device as claimed in claim 4, including: means adapted to adjust the distance between said further, cylindrical surfaces whereby the device may be adjusted to operate upon saws of various thicknesses.

6. A device as claimed in claim 1, wherein:
    said two surfaces are convergent upon one another whereby a tapered swage may be produced; and including:
        guide means having a surface adapted to engage the tops of the teeth; and
        means for adjusting the position of said guide means surface relative to said two surfaces whereby the set imposed on a saw may be selected.

7. A device as claimed in claim 1, including:
    handles adapted to be manually grasped for moving the device over a stationary saw; and
    pawl means adapted to move relative to the device so as to ride over the tops of teeth when the device is moved in one direction over a saw and to engage the throat of a tooth when the device is moved in the opposite direction.

8. A device as claimed in claim 2, wherein:
said two surfaces formed by peripheral cross-sectionally circular surfaces of said rollers are frusto-conical surfaces whereby a tapered swage may be produced; and including
    guide means having a surface adapted to engage the tops of the teeth; and
    means for adjusting the position of said guide means surface relative to said two surfaces whereby the set imposed on a saw may be selected.

References Cited
UNITED STATES PATENTS

| | | | |
|---|---|---|---|
| 760,198 | 5/1904 | Hargreaves | 76—49 |
| 1,064,419 | 6/1913 | Anthony | 76—49 |
| 1,382,743 | 6/1921 | Pribnow | 76—49 |

BERNARD STICKNEY, Primary Examiner